April 26, 1932.  J. VEHKO  1,856,006
VEHICLE BODY CONSTRUCTION
Filed Oct. 13, 1928   2 Sheets-Sheet 1
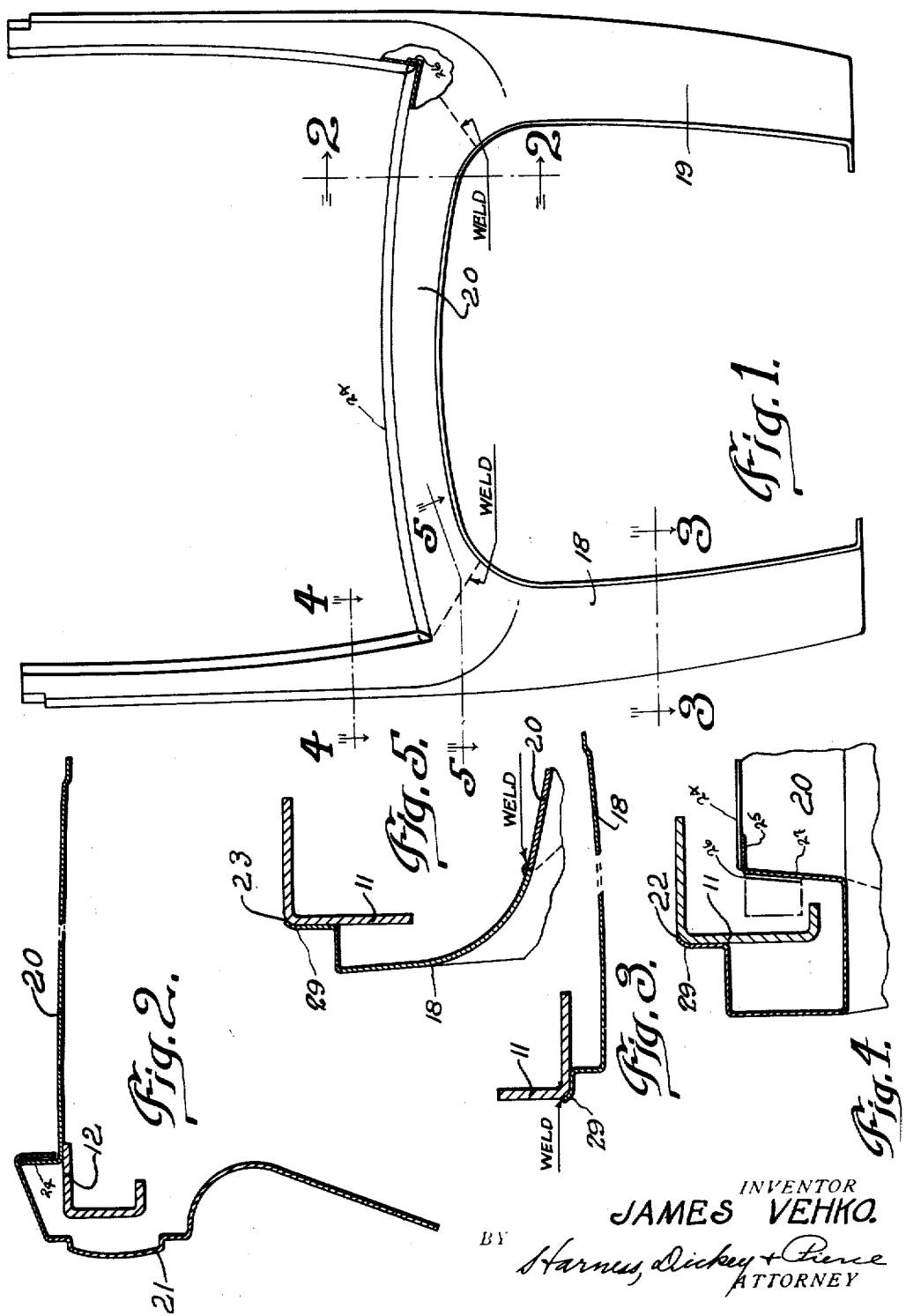
INVENTOR
JAMES VEHKO.
BY Harness, Dickey & Pierce
ATTORNEY April 26, 1932. J. VEHKO 1,856,006
VEHICLE BODY CONSTRUCTION
Filed Oct. 13, 1928 2 Sheets-Sheet 2
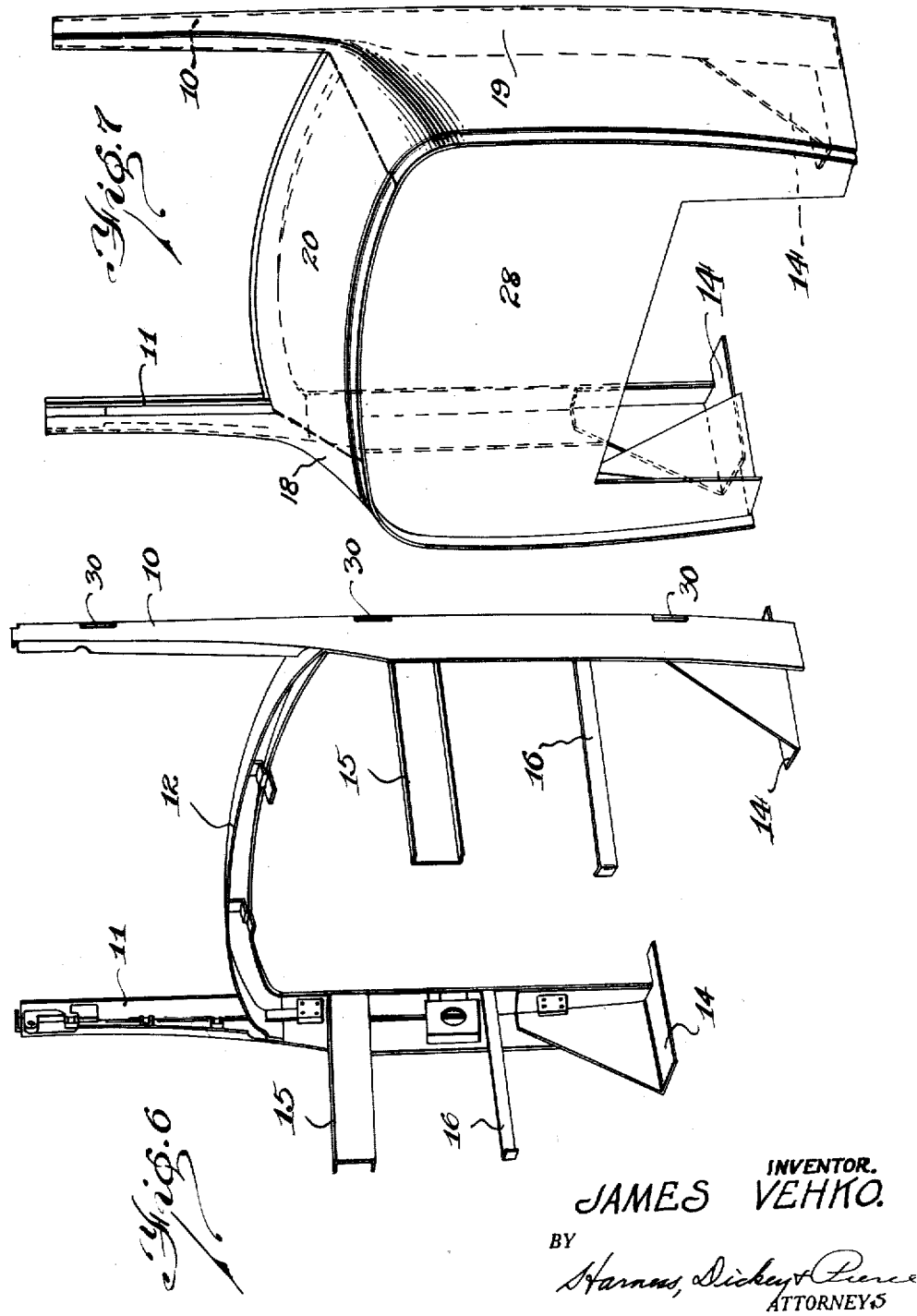
INVENTOR.
JAMES VEHKO.
BY
ATTORNEYS Patented Apr. 26, 1932

1,856,006

UNITED STATES PATENT OFFICE

JAMES VEHKO, OF DETROIT, MICHIGAN, ASSIGNOR TO THE MURRAY CORPORATION OF AMERICA, A CORPORATION OF DELAWARE

VEHICLE BODY CONSTRUCTION

Application filed October 13, 1928. Serial No. 312,224.

One object of my invention is to provide a unitary subassembly for a vehicle body comprising the cover panels for the forward pillars, side panels for the cowl, and top panel for the cowl which may be applied to the body frame as a unit.

Another object of my invention is to provide such a subassembly of a minimum number of stampings.

Another object of my invention is to provide a unitary subassembly for vehicle body comprising the front pillar members and the cowl and the cover panels therefor which may be assembled to the rest of the vehicle body as a unit.

Another object of my invention is to provide a unitary subassembly for a vehicle body comprising the forward pillars, the cowl and dash panels which may be assembled to the rest of the vehicle body as a unit.

With these and other objects in view, my invention consists in the arrangement, combination and construction of the various parts of my improved device, as described in the specification, claimed in my claims, and shown in the accompanying drawings, in which—

Fig. 1 is a front elevation of my pillar cover panel and cowl panel assembly before being applied to the pillar assembly shown in Fig. 6.

Fig. 2 is a view taken on line 2—2 of Fig. 1.
Fig. 3 is a view taken on line 3—3 of Fig. 1.
Fig. 4 is a view taken on line 4—4 of Fig. 1.
Fig. 5 is a view taken on line 5—5 of Fig. 1.
Fig. 6 is a perspective of the forward pillars, cowl bar, and bracing members embodied in my unitary assembly.

Fig. 7 is a perspective of the panel subassembly shown in Fig. 1 applied to the pillar subassembly shown in Fig. 6.

The numerals 10 and 11 designate the forward pillars for a vehicle body which are connected intermediate their ends by the cowl bar 12, and which extend from the underframing or sills of the body (not shown) to the roof of the body. The pillars 10 and 11 are of angle cross section below the cowl bar as shown in Fig. 3 and of channel cross section above the cowl bar and along the sides of the windshield opening as shown in Fig. 4. In the portions of angular cross section one flange extends inwardly toward the opposite pillar and the other flange extends longitudinally of the vehicle body as shown. In the portions of channel cross section the channel sides each extend inwardly toward the opposite pillar. The cowl bar is preferably of channel cross section with the channel sides extending forwardly as shown in Fig. 6. Angle sill braces 14 are secured to the lower end of the pillars and forwardly extending dash braces 15 and 16 are secured to the intermediate portions of the pillars as shown in Fig. 6. The pillar members and cowl bar are of a construction shown in the application of Marvin W. Moesta, Serial No. 276,263, filed May 9th, 1928, now Patent No. 1,818,734, dated Aug. 11, 1931.

Heretofore, it has been the practice in covering the parts of the pillars 10 and 11 which extend above the cowl bar 12 and form side frames for the windshield opening, to provide separate panels which extend to about the point where the cowl bar joins the pillar where a joint is made with the side cowl panel. It is difficult to make this joint smooth so that it will not affect the appearance of the body, and it has been found at times that such a joint will work loose and produce an objectionable noise.

I have therefore devised the cover panels for the forward pillars and the cowl, shown in Fig. 1, which may be assembled and secured together separately and applied as a unit to the pillar assembly shown in Fig. 6. The assembly is composed of three panels 18, 19 and 20. The panels 18 and 19 are utilized, one for each pillar which in its upper portion above the cowl bar 12 along the side of the windshield opening is of the cross section shown in Fig. 4, and which below the cowl bar 12 is of the cross section shown in Fig. 3. Those portions of the side panels which extend above the cowl bar and along the windshield opening are provided with inwardly extending flanges 25 along their inner edges which provide stops for the sides of the windshield (not shown). The panels 18 and 19 extends forwardly at about the point where the cowl bar joins the pillar and forms the side panel for the cowl section. The central panel member 20 extends between the upper edges of the forwardly extending portions of the side panels 18 and 19 and is secured thereto preferably by butt-welding which produces a smooth joint. The rear edge of the central panel 20 is upturned to form a flange 24 which rests upon the upper flange of the cowl bar 12 and connects there with the instrument panel 21 as indicated in Fig. 2, forming an abutment for the lower edge of the windshield.

Each end of the flange 24 is welded to the lower rear side of the inturned flange 25 of the pillar cover panel as shown in Fig. 4. Another flange 26 is turned up on each rear side edge of the panel 20 and overlaps and is welded to the lower end of the rearwardly extending portion 27 of the pillar cover panel as shown in Figs. 1 and 4. A dash panel 28 is provided for the forward end of the cowl section and fits against and is secured to the forward edges of the central and side panels. The weld lines between the central panel and the side panels are indicated by the dotted lines designated by the word "weld" in Fig. 1. The pillar cover portions of the side panels are welded to the pillars as at 22, Fig. 4, and the lower portions of the side panels are welded to the lower portions of the pillar members as at 23, Fig. 5. The rear edges of the panels 18 and 19 and the corresponding edges of the pillar cover extension thereof, may be flanged, as at 29 in Figs. 3 and 4, for engagement with the pillars, along which welds are made as above designated to effect a junction therebetween.

The construction described permits the formation of a subassembly which comprises the cover panels for the forward pillars and the panels for the cowl section as a unit which may be applied as such to the subassembly comprising the forward pillar members. The panels for the cowl section with or without the dash panel, and the pillar assembly form a subassembly which may be applied to the sills of the body (not shown) as a unit. Openings may be provided in the pillar cover panels to correspond with the hinge plate openings 30 in the pillars, Fig. 6, where it is desired to hinge the doors of the body to the forward pillars.

This construction provides a forward section with a minimum of panel joints and also reduces materially the cost of construction and assembly and is particularly valuable in mass production where a large number of bodies of the same kind are being produced.

Formal changes may be made in the specific embodiment of the invention described without departing from the spirit or substance of the broad invention, the scope of which is commensurate with the appended claims.

What I claim is:

1. In vehicle body construction, in combination with a pair of forward pillars extending from the top of the windshield to the bottom of the body, and a cowl bar extending between and secured to the intermediate portions of said pillars, a pair of metal stampings forming side panel members covering said pillars over their length and extending forwardly and forming the sides of the cowl panel, a central panel member joined at its side edges to the upper edges of the forwardly extending portions of said side panel members and forming the top of said cowl panel.

2. In closed vehicle body construction, in combination with a pair of forward pillar members extending from top to bottom of said body and a cowl bar extending between and joined to the intermediate portions of said pillar members, a pair of metal stampings forming side panel members each covering the exterior portions of one of said pillars and extending forwardly from and below the points at which said cowl bar joins said pillars over the length thereof, to the forward end of the cowl section and forming the sides of the cowl section, a single metal stamping forming a central panel member having its rear edge secured to said cowl bar and its side edges secured to the upper edges of the forwardly extending portions of said side panel members and extending forwardly to the front end of the cowl section and forming the top of the cowl section.

3. In vehicle body construction, a unitary subassembly comprising a pair of forward pillars extending from the top of the windshield to the bottom of the body, a cowl bar extending between and secured to the intermediate portions of said pillars, a pair of metal stampings forming side panels secured to and covering the exterior surfaces of said pillars over the length thereof and extending forwardly from and below the points at which said cowl bar joins said pillars and forming the sides of the cowl section, and a single metal stamping forming a central panel member extending between and secured to the upper edges of the forwardly extending portions of said side panel members and forming the top of the cowl section.

4. In vehicle body construction, a subassembly unit comprising a pair of forward pillars extending from the top of the windshield to the bottom of the body, a cowl bar extending between and secured to the intermediate portions of said pillars, a pair of metal stampings forming side panel members secured to and covering the exterior surfaces of said pillars over the length thereof and having their lower portions extending forwardly and forming the sides of the cowl section, a single metal stamping forming a central panel member extending between and secured to the upper edges of the forwardly extending portions of said panels and forming the top of said cowl section, and a forward panel member extending between and secured to the forward edges of said side panels and said central panel and forming the forward end of said cowl section.

5. In vehicle body construction, a sub-assembly unit comprising a pair of metal stampings for side panels formed in their upper portions to cover the exterior surfaces of the forward pillar members which extend from the top of the windshield to the bottom of the body and having forwardly extending lower side portions forming the sides of the cowl section, and a single metal stamping forming a central panel member extending between and secured to the upper edges of the forwardly extending portions of the side panels and forming the top of the cowl section.

6. In closed vehicle body construction, a panel unit comprising a pair of metal stampings each formed to cover one of the forward body pillars from the top of the windshield to the bottom of the body and form a side of the cowl section, and a stamping formed to join the upper portions of said cowl sides and forming the top of the cowl section.

7. In a vehicle body construction, a panel unit comprising a pair of stampings having relatively narrow top portions forming corner pillar sections and relatively wide lower portions forming side cowl sections, and a third stamping secured to said lower portions and forming a top cowl section.

8. In vehicle body construction, a panel unit comprising a pair of stampings having relatively narrow top portions forming corner pillar sections and relatively wide lower portions forming side cowl sections, a third stamping secured to said lower portions and forming a top cowl section, and a fourth stamping secured to the third and forming an instrument panel.

9. In vehicle body construction, a panel unit comprising a pair of stampings having relatively narrow top portions forming corner pillar sections and relatively wide lower portions forming side cowl sections and a third stamping secured to said lower portions and forming a top cowl section, said third stamping having a flange formed thereon and an instrument panel stamping having a flange mating with the aforesaid flange and secured thereto.

10. In vehicle body construction, a panel unit comprising a pair of stampings having relatively narrow top portions forming corner pillar sections and relatively wide lower portions forming side cowl sections and a third stamping secured to said lower portions and forming a top cowl section, said third stamping having a flange formed thereon and said pair of stampings having flanges thereon mating with the flange on the third stamping and secured thereto.

11. In vehicle body construction, a panel unit comprising a pair of stampings having relatively narrow top portions forming corner pillar sections and relatively wide lower portions forming side cowl sections, a third stamping secured to said lower portions and forming a top cowl section, and a fourth stamping secured to the three stampings and forming a dash section.

12. In vehicle body construction, a panel unit for the front section of the body comprising a pair of stampings each having a lower portion forming a side of the cowl section and an upper portion forming a pillar cover panel along the side of the windshield opening, and a third stamping integrally joined along its edges to the upper edges of the cowl side panels and forming the top of the cowl section, said upper portions of said side panels having lateral flanges extending into the windshield opening and forming abutments for the sides of the windshield.

13. In a vehicle body construction, a panel unit for the front section of the body comprising a pair of stampings each having a lower portion forming a side of the cowl section and an upper portion forming a pillar cover panel along the side of the windshield opening, and a third stamping integrally joined along its edges to the upper edges of the cowl side panels and forming the top of the cowl section, said upper portions of said side panels having lateral flanges extending into the windshield opening and forming abutments for the sides of the windshield, and said cowl top panel having an upturned flange at its rear edge forming an abutment for the lower edge of the windshield.

14. In a cowl unit for vehicle bodies, independently formed pressed metal shroud panel side members, upwardly extending door pillar elements formed integrally therewith, and an intermediate pressed metal shroud panel member secured to said shroud panel side members to form a complete cowl shroud panel.

15. In a cowl unit for vehicle bodies, a pair of spaced pressed metal shroud panel side members having door pillar elements formed integral therewith and extending upwardly therefrom, and an intermediate shroud panel member bridging the space between the welded to said side members to form a complete cowl unit.

16. A cowl unit for vehicle bodies comprising, a pair of independently formed pressed metal shroud panel side members having inturned flanges at the rear edges thereof, upwardly extending channel-shaped pillar elements integral with said side members, one flange thereof being a continuation of one of said inturned flanges, and an intermediate pressed metal shroud panel member welded along its ends to the upper ends of said side members to form a complete cowl unit.

17. A cowl unit for vehicle bodies comprising, a pair of independently formed pressed metal shroud panel side members having integral door pillar elements and finishing panels formed therewith, and an intermediate pressed metal shroud panel member welded along its ends to the upper ends of said side members to form a complete cowl unit.

18. A cowl unit for vehicle bodies comprising, three members, namely, two independently formed side members including integral door pillar elements, and an intermediate member welded at its ends to the upper ends of said side members.

JAMES VEHKO.

CERTIFICATE OF CORRECTION.

Patent No. 1,856,006.          April 26, 1932.

JAMES VEHKO.

It is hereby certified that error appears in the printed specification of the above numbered patent requiring correction as follows: Page 3, line 5, claim 4, after the word "said" insert the word side, and line 6, same claim, after the article "a" insert the words single metal stamping forming a; same page, line 122, claim 15, for the word "the" second occurrence read and; and that the said Letters Patent should be read with these corrections therein that the same may conform to the record of the case in the Patent Office.

Signed and sealed this 5th day of July, A. D. 1932.

(Seal)

M. J. Moore,
Acting Commissioner of Patents.

flange thereof being a continuation of one of said inturned flanges, and an intermediate pressed metal shroud panel member welded along its ends to the upper ends of said side members to form a complete cowl unit.

17. A cowl unit for vehicle bodies comprising, a pair of independently formed pressed metal shroud panel side members having integral door pillar elements and finishing panels formed therewith, and an intermediate pressed metal shroud panel member welded along its ends to the upper ends of said side members to form a complete cowl unit.

18. A cowl unit for vehicle bodies comprising, three members, namely, two independently formed side members including integral door pillar elements, and an intermediate member welded at its ends to the upper ends of said side members.

JAMES VEHKO.

CERTIFICATE OF CORRECTION.

Patent No. 1,856,006.                  April 26, 1932.

JAMES VEHKO.

It is hereby certified that error appears in the printed specification of the above numbered patent requiring correction as follows: Page 3, line 5, claim 4, after the word "said" insert the word side, and line 6, same claim, after the article "a" insert the words single metal stamping forming a; same page, line 122, claim 15, for the word "the" second occurrence read and; and that the said Letters Patent should be read with these corrections therein that the same may conform to the record of the case in the Patent Office.

Signed and sealed this 5th day of July, A. D. 1932.

(Seal)

M. J. Moore,
Acting Commissioner of Patents.

CERTIFICATE OF CORRECTION.

Patent No. 1,856,006.                                                           April 26, 1932.

JAMES VEHKO.

It is hereby certified that error appears in the printed specification of the above numbered patent requiring correction as follows: Page 3, line 5, claim 4, after the word "said" insert the word side, and line 6, same claim, after the article "a" insert the words single metal stamping forming a; same page, line 122, claim 15, for the word "the" second occurrence read and; and that the said Letters Patent should be read with these corrections therein that the same may conform to the record of the case in the Patent Office.

Signed and sealed this 5th day of July, A. D. 1932.

(Seal)                                                                 M. J. Moore,
                                                                           Acting Commissioner of Patents.